UNITED STATES PATENT OFFICE.

GUILLAUME DE CHALMOT, OF HOLCOMB'S ROCK, VIRGINIA, ASSIGNOR, BY MESNE ASSIGNMENTS, TO THE WILLSON ALUMINUM COMPANY, OF NEW YORK, N. Y.

PROCESS OF PRODUCING SILICIDS OF IRON.

SPECIFICATION forming part of Letters Patent No. 602,976, dated April 26, 1898.

Original application filed September 6, 1895, Serial No. 561,659. Divided and this application filed September 22, 1897. Serial No. 652,629. (No specimens.)

*To all whom it may concern:*

Be it known that I, GUILLAUME DE CHALMOT, a citizen of the United States, residing at Holcomb's Rock, in the county of Bedford and State of Virginia, have invented certain new and useful Improvements in the Production of Silicids of Iron, of which the following is a specification.

This invention relates to the production of ferrosilicids having from twenty-five to fifty per cent. of silicon. A twenty-five-per-cent. silicid having the formula $Si_2Fe_3$ and also higher silicids containing that ingredient are claimed in my application, Serial No. 561,659, filed September 6, 1895, of which my present application is in part a division.

My present application relates chiefly to the process of producing such silicids by electric smelting, and includes also the product of fifty-per-cent. silicon, having the formula $Si_2Fe$, which is producible by this process.

According to my invention I take a silicon compound, iron or an iron compound, and a carbonaceous material, all finely pulverized, and mixing them together in proper proportions I heat them in an electric furnace fed by a sufficient electric current and for a suitable time to effect the reaction. By this means I produce a silicid of iron containing twenty-five per cent. or more of silicon and which may contain as high as forty or fifty per cent. or more of silicon.

As the silicon compound or source of silicon, sand (silica) will be generally used; but silicates, as feldspar, mica, &c., may be used instead. As the source of iron, any kind of iron ore can be used; but it is best to use an iron ore which does not contain too many impurities, unless the latter be silicates. Metallic iron might be used, but without any special advantage over iron ore. In fact, a soft iron ore which can be easily pulverized is preferable. As the carbonaceous matter, coke is preferable. Coke with a high percentage of ash is quite suitable, so long as the ash is mainly composed of silica and iron oxid. Other carbonaceous matters, as coal, charcoal, pitch, &c., may be used.

In some cases it is desirable to add a flux. As a flux, lime or magnesia is suitable, either in the form of carbonates, hydrates, or oxids. Soda or potash or other bases or their salts can also be used. The use of a flux is not indispensable and may be omitted.

The electric furnace can be heated by either a direct or alternating current. The electromotive force and volume of current are variable according to the size of the furnace and the quantity of matter under treatment, as is now well understood in the practical management of electric furnaces. Sufficient electrical energy should be expended to generate the required temperature and maintained a sufficient time to effect the reaction, the smelting operation being continued for several hours. The produced ferrosilicid can be tapped out from the furnace, or it can be allowed to cool and then taken out with the slag, from which it can be easily separated, or the slag may be continuously removed and the metal collected on the bottom of the furnace.

In conducting the process the iron ore and the silica are reduced by the carbon and the reduced silicon and iron combine to form the silicids $Si_2Fe_3$ and $Si_2Fe$. The resulting product is usually an alloy resulting from the fusion together of these silicids in varying proportions. The proportions in which these silicids are respectively produced depend upon the relative proportions of reduced silicon and iron. Hence to produce the higher silicids I employ an increased proportion of silica relatively to the iron or iron ore, in any case employing sufficient carbonaceous matter to reduce the silicon and iron for the required product. With the minimum proportion of silica the product will be pure or nearly pure $Si_2Fe_3$. As the proportion or excess of silica is increased the product contains a higher proportion of $Si_2Fe$, until when a maximum richness is reached the product becomes pure or nearly pure $Si_2Fe$. A silicid of from forty to fifty per cent. silicon is readily obtainable in one operation by the use of a sufficient proportion of silica.

It is of great practical advantage to keep the amount of slag produced as low as possible, and to this end the materials used should be of the highest obtainable purity. In any case I employ silica or other silicon compound in excess of the calculated proportion, as there is always some vaporization of the silica or silicon, and there is usually some unreduced silica left in the furnace.

My process may be duplicated in case the required high percentage of silicon is not attained with a single smelting by submitting the product with a further quantity of silica and carbon to a second electric smelting operation; but if the process is correctly managed I find this duplication to be unnecessary.

As a modification of my process instead of using iron or iron ore an iron containing already some proportion of silicon may be employed—as, for example, any of the ordinary commercial ferrosilicids of approximately ten to thirteen per cent. silicon. In this way a part of the silicon may be more cheaply introduced into the product than if it were all reduced from silica by the electric smelting process.

It is important that all of the ingredients should be finely pulverized or granulated (especially so with the silica and carbon) and intimately mixed together to form a homogeneous powder which is fed to the furnace.

The products $Si_2Fe_3$ and $Si_2Fe$ are both new compounds. The former and also admixtures of the two are claimed in my aforesaid application. These compounds are entirely soluble in cold hydrofluoric acid. The ferrosilicid of twenty-five to thirty per cent. of silicon is crystalline and white as silver. The alloy of from forty to fifty per cent. silicon is gray and crystalline. All these silicids are very resistant to the action of acids and acid oxidizing agents, being more so as the percentage of silicon increases. All these ferrosilicids are very hard, sufficiently so to scratch window-glass, but are not capable of scratching such hard substances as chrome-steel, ruby, or diamond.

It is essential to my process that the carbon used as a reducing agent shall be eliminated in the course of the reaction and shall not appear in the product as a carbid. The production of silicon carbid is foreign to my invention.

Inasmuch as my invention can be worked either with metallic iron or with an oxid, ore, or compound of iron, it is to be understood that the word "iron" as used in my claims includes either metallic iron or any such other source of iron.

I claim as my invention—

1. The described process of producing ferrosilicids, which consists in subjecting a silicon compound with iron and carbonaceous matter to the heat of an electric furnace for a sufficient time to eliminate the carbonaceous matter, reduce the silicon compound, and form a substantially pure compound of silicon and iron, containing twenty-five per cent. or upward of silicon.

2. The described process of producing ferrosilicids of twenty-five to fifty per cent. or more of silicon, which consists in subjecting a silicon compound with iron and carbonaceous matter, the silicon compound being in excess, to the heat of an electric furnace until the carbonaceous matter is eliminated and the silicon compound is reduced, leaving a substantially pure compound of silicon with iron.

3. The described process of producing ferrosilicids, which consists in subjecting oxids of silicon and iron with carbonaceous matter and a flux, to the heat of an electric furnace, until the carbonaceous matter is eliminated and said oxids are reduced, leaving a substantially pure compound of silicon and iron.

4. The described process of producing ferrosilicids, which consists in subjecting silica and an iron containing silicon, with carbonaceous matter, to electric smelting until the carbonaceous matter is eliminated by reducing the silica, and the reduced silicon is alloyed with the iron to form a higher silicid.

5. The described new product, being ferrosilicid containing approximately fifty per cent. of silicon, and having the formula $Si_2Fe$.

In witness whereof I have hereunto signed my name in the presence of two subscribing witnesses.

GUILLAUME DE CHALMOT.

Witnesses:
 GEO. T. LANCASTER,
 JOHN C. TEMPLE.